US009441994B2

(12) United States Patent
Minks et al.

(10) Patent No.: US 9,441,994 B2
(45) Date of Patent: Sep. 13, 2016

(54) MASS AIR FLOW SENSOR

(75) Inventors: Jeff Minks, Orlando, FL (US); Gary Morissette, Orlando, FL (US); Mario Cespedes, Orlando, FL (US)

(73) Assignee: WAI Global, Inc., Ft. Lauderdale, FL (US)

( * ) Notice: Subject to any disclaimer, the term of this patent is extended or adjusted under 35 U.S.C. 154(b) by 278 days.

(21) Appl. No.: 13/293,852

(22) Filed: Nov. 10, 2011

(65) Prior Publication Data

US 2012/0111105 A1 May 10, 2012

Related U.S. Application Data

(60) Provisional application No. 61/412,158, filed on Nov. 10, 2010.

(51) Int. Cl.
*G01N 25/00* (2006.01)
*G01F 1/696* (2006.01)

(52) U.S. Cl.
CPC ..................... *G01F 1/696* (2013.01)

(58) Field of Classification Search
USPC ................. 324/610; 73/204.14, 861, 861.03; 374/114, 185, 45
See application file for complete search history.

(56) References Cited

U.S. PATENT DOCUMENTS

| 4,648,271 | A | * | 3/1987 | Woolf | 73/204.27 |
| 6,950,760 | B2 | * | 9/2005 | Henry et al. | 702/45 |
| 6,968,283 | B2 | * | 11/2005 | Matsumura et al. | 702/100 |
| 7,010,971 | B2 | * | 3/2006 | Matsumoto et al. | 73/204.15 |
| 2004/0055374 | A1 | * | 3/2004 | Cohen et al. | 73/204.11 |
| 2005/0034532 | A1 | * | 2/2005 | Wible | 73/861.03 |
| 2005/0150310 | A1 | * | 7/2005 | Beversdorf | 73/861.85 |
| 2007/0251315 | A1 | * | 11/2007 | Sukegawa et al. | 73/204.27 |
| 2008/0121033 | A1 | * | 5/2008 | Molnar | 73/204.14 |
| 2008/0229818 | A1 | * | 9/2008 | Nakano et al. | 73/204.26 |

* cited by examiner

*Primary Examiner* — Lisa Caputo
*Assistant Examiner* — Nasir U Ahmed
(74) *Attorney, Agent, or Firm* — Stephen J. Stark; Miller & Martin PLLC

(57) ABSTRACT

A digitally based resistance element and a processor are used with a hotwire to provide a mass airflow (MAF) sensor. A temperature sensor can provide an input to the processor which can provide signals to the digital based resistance element. The digital based resistance element may be on a first leg of a Wheatstone bridge, the hotwire on a second leg. The output of the hotwire may be provided to the processor which can modify the output such as to more closely approximate a MAF curve, and/or to address step changes initiated by the digital based resistive element.

16 Claims, 1 Drawing Sheet

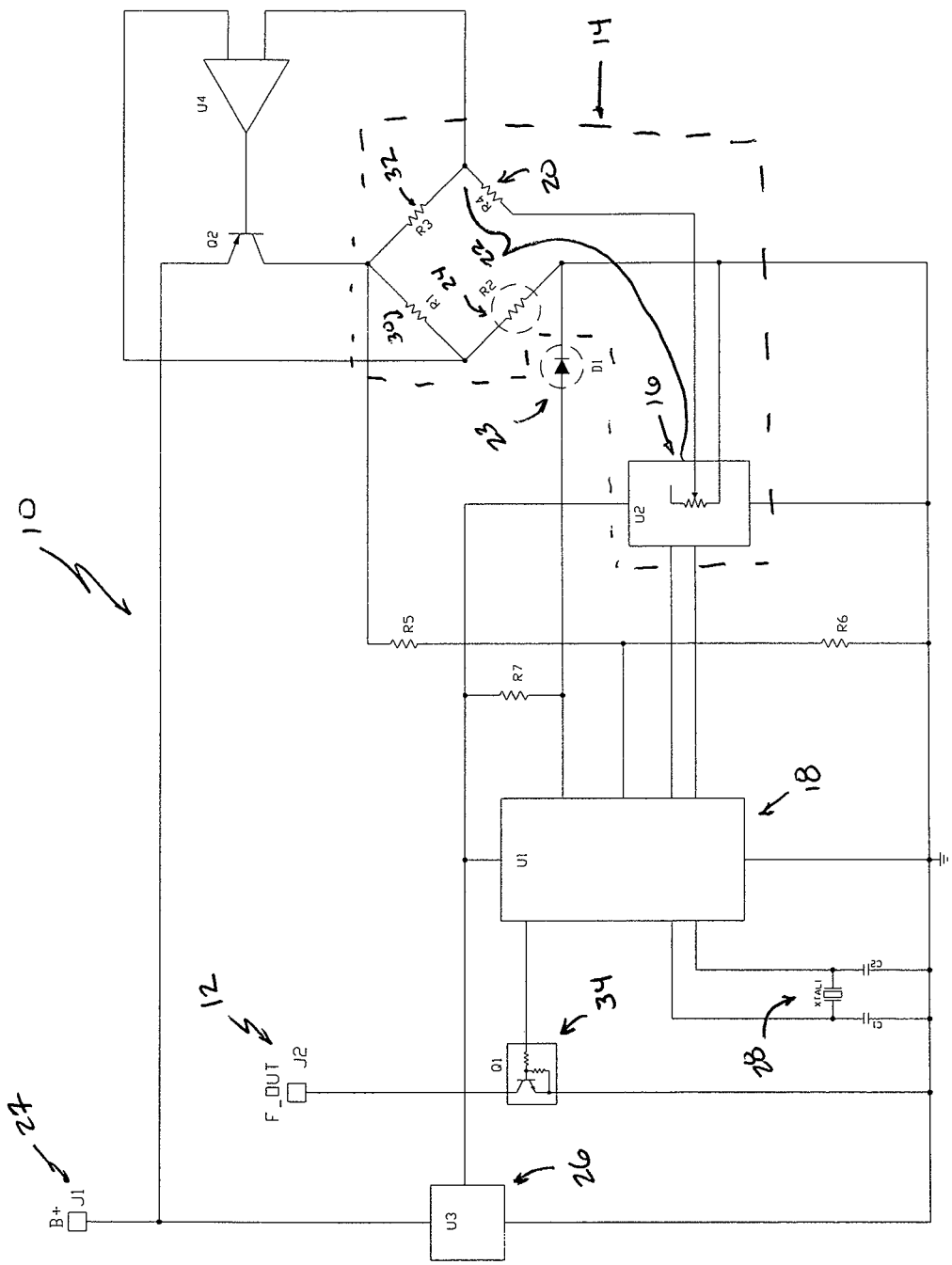

MASS AIR FLOW SENSOR

CLAIM OF PRIORITY

This application claims the benefit of U.S. Provisional Patent Application No. 61/412,158 filed Nov. 10, 2010.

FIELD OF THE INVENTION

The present invention relates to a mass air flow sensor which, instead of relying on an analog based thermistor utilized in conjunction with a platinum hot wire, a digital based resistive element in combination with a microcontroller and temperature sensor replace the thermistor to provide a resistance in a bridge in an effort to provide an improved sensor.

BACKGROUND OF THE INVENTION

Mass air flow sensors have been utilized for many years with electronic fuel injection engines. For an internal combustion engine to run, it needs air and fuel mixed together ideally in a proper ratio. In electronic fuel injected engines, the engine control module (ECM) receives input related to how much air is used by an engine so that the correct amount of fuel can be injected.

Mass air flow meters (MAF) provides an output which is the input into the ECM relative to the amount of air directed into the engine. Mass air flow sensors normally convert the amount of air drawn into the engine into a voltage or frequency signal provided to the ECM. The mass air flow (MAF) sensor is usually located in the intake air stream between the air cleaner and the throttle body.

The basic operating principle of a MAF is as follows. A Wheatstone bridge is provided with the MAF such that an adjustable resistor, normally a thermistor, is utilized to sense temperature of incoming air. A second resistor is a sensor, such as a platinum hot wire, is normally heated to a constant temperature in relation to the thermistor. Increased air flow will cause the hot wire to lose heat faster. The MAF will compensate by sending more current through the wire. The MAF simultaneously measures the current flow and outputs a voltage or frequency signal in proportion to the current flow through the hot wire. The more air flow that flows over the sensor, the more voltage or higher frequency is typically sent.

As air temperature rises, the hot wire temperature will also need to rise. This adjustment is known as temperature compensation. For example, if the platinum hot wire is heated to 225° Celsius and the air temperature is at 25° Celsius, the difference is 200° Celsius. However, if the air temperature rises to 45° Celsius, the hot wire temperature also needs to rise to maintain the 200° difference so it would move the hot wire temperature to 245° Celsius through the temperature compensation process. A detailed description of temperature compensation is taught in U.S. Pat. No. 4,807,151 which is incorporated herein by reference which discusses temperature compensation.

A number of the manufacturers are providing mass air flow meters to market. The constraints of these prior art system prevent the MAF from changing temperature compensation, (it is fixed) under changing conditions. U.S. Pat. No. 4,807,151 provides for an ability to change gain to at least a portion of the output in an analog manner, but no ability is provided to affect the output either before generating the output or afterwards based on changing conditions. Furthermore, the thermistor in addition to the platinum hot wire is required by the circuit. Finally, laser trimming such as that taught in U.S. Pat. No. 5,493,892 (herein incorporated by reference) discusses the laser calibration of the two resistors which are not thermistors in the bridge is typically required. The laser trimming process is time intensive and the thermistor is relatively expensive, thereby increasing the cost of providing the mass air flow sensor.

Decreasing the cost, eliminating the laser trimming step, and/or other affects would be desirable for many applications. Accordingly, there exists a need for an improved mass air flow sensor for these and other reasons.

SUMMARY OF THE INVENTION

It is a present object of at least some embodiments of the present invention to provide a temperature signal to a microprocessor which in turn provides a digital output relative to the temperature signal which is preferably provided in the digital format to a digital potentiometer which receives a digital signal and then changes and provides a stepped change in resistance based on the digital signal input.

Another object of at least some embodiments of the present invention provides an ability for a mass air flow sensor to receive a digital input to an adjustable resistive device as a portion of a mass air flow filter Wheatstone bridge such as opposite the hot wire sensor.

It is another object for at least some embodiments of the present invention to provide a microprocessor in a mass air flow sensor which is configured to provide and account for step resistive increases on a bridge such as a Wheatstone bridge as could be caused by digital based increases. Examples of current accounting methods used by the applicant include (a) ignoring the output of the sensor for a specified period of time, possibly holding to a pre-increase output for the mass air flow sensor, (b) calculating the anticipated output of the mass air flow sensor and providing that FIGURE as an output for a predetermined period of time, or (c) otherwise addressing or experiencing the ripple effect at the output. In some embodiments, dealing with the ripple effect caused by step increases in resistance on the bridge is a possibility.

Accordingly, in accordance with the presently preferred embodiment of the present invention, a mass air flow sensor is provided which includes a Wheatstone bridge having one or more hot wire elements inserted on one side of the bridge and a preferably digitally based resistive element on the opposite side of the bridge whereby step increments can be made in the resistive load on the opposite side of the bridge. Preferably, a temperature sensor such as a diode can provide input to a microprocessor which can then provide a signal to the digital resistive element such as a digital biased signal to a digital potentiometer to account for temperature variations as they have on the output of the hot wire. Failing to account for temperature variation side of the bridge would otherwise throw the total calculation of mass flow off as it relates to the side opposite from the hot wire sensor.

The temperature sensor employed in the improved system could be a diode, integrated circuit or other temperature sensor, even a thermistor, which provides an output to a microcontroller. The microcontroller can then provide an output to a digital based resistive element such as a potentiometer to account for temperature variation. In addition to accounting for temperature variation, manipulation of the signal to affect the output of the hot wire can occur such as to provide more accurate mass air flow calculations than would otherwise be possible prior art technology.

Specifically, not only can gain be changeable over temperature ranges such as with prior art embodiments such as U.S. Pat. No. 4,807,151, but instead, the actual mass flow can have curves closer approximations provided. The microprocessor can adjust the potentiometer based on the effects of temperature on actual mass flow. In fact, instead of just changing value of gain as has been done with prior art analog systems such as is taught in U.S. Pat. No. 4,807,151, the microprocessor could solve simultaneous solutions of multiple equations to be able to temperature compensate a mass air flow sensor circuit and/or otherwise adjust compensation "on the fly."

By utilizing the applicant's preferred technology, a resistor is utilized in series with the potentiometer so that the potentiometer does not vary over the entire range of resistance of that side of the bridge opposite the hot wire, but can instead provide more precise increments at a lower cost. Furthermore, when calibrating mass air flow such as utilizing applicant's improved design, there is no need laser trim the resistors opposite the hot wire and potentiometer. Instead, the temperature of the hot wire can be measured on a calibration stand, the positions of the potentiometer can be identified so that the processor (i.e., microcontroller) can be programmed to account for the specific circuit at issue for precise calibration of the microcontroller without laser trimming the opposing resistive elements. These and other advantages of the applicant's new design will be understood by those of ordinary skill in the art.

BRIEF DESCRIPTION OF THE DRAWINGS

The particular features and advantages of the invention as well as other objects will become apparent from the following description taken in connection with the accompanying drawings in which:

FIG. 1 is a circuit diagram of a mass air flow sensor of a presently preferred embodiment of the present invention.

DETAILED DESCRIPTION OF THE PREFERRED EMBODIMENT

The FIGURE shows a circuit 10 of a presently preferred embodiment of the present invention. The circuit 10 is a mass air flow sensor which provides an output 12 related to the mass air flow sensed by the circuit 10. Prior art mass air flow sensors are analog based and provide an analog Wheatstone bridge which utilizes all analog components.

In bridge 14, shown internal to the dotted lines, a digital based resistive element shown as digital potentiometer 16 is provided. The digital potentiometer 16 receives a signal from a processor illustrated as possibly microprocessor 18. A digital input to the digital potentiometer 16 to therefore change its resistance in the leg 22. In the illustrated embodiment, the resistance changes over a range of about five kilo-ohms (KSΩ). Of course, a 10KSΩ potentiometer or other potentiometer could be utilized by the applicant. The particular potentiometer utilized is a 256 step potentiometer. Each step corresponds to approximately 0.7° Celsius. Accordingly, a 10 step change would correspond to 7° Celsius. Other potentiometers could have other step characteristics causing potentiometer 16 with resistor 20 in leg 22 provides relatively precise temperature control over a desired range without requiring the potentiometer 16 to provide the desired resistance across leg 22 of bridge as would be understood by those of ordinary skill in the art.

As opposed to prior art technology, the leg 22 is not directly affected by the temperature. Thermistors are normally located along leg 22. Instead, leg 22 indirectly affected by temperature. The digital potentiometer 16 does not sense temperature, but instead receives an input from microcontroller 18 preferably based on temperature. Effects of temperature is provided as an input to the microcontroller 18 from temperature sensor such as diode 23. Temperature sensor 23 could be as simple as a diode, an integrated circuit or other temperature sensor, even a thermistor. Accordingly, instead of having a thermistor on leg 22, the temperature sensor is remotely disposed relative to leg 22 which does not occur with any known mass air flow sensor other than the applicants.

Additionally, while the output of the temperature sensor 23 is analog, it is received by the microprocessor 18. A digital signal can then be provided as an input to the digital potentiometer 16. Other embodiments may provide an integrated circuit temperature sensor which can vary voltage or current or even provide a digital output such as provided by various manufacturers such as National Semi, Analog Devices, Dallas, Telecom Semi, Fairchild and others.

The bridge 14 (except for leg 22) may work very similarly to prior art bridges. The hot wire 24 is preferably a platinum hot wire, which can be maintained at a constant temperature. The relative current across the hot wire 24 varies with the mass flow as it is normally located in the stream of air flow. The current through the hot wire 24 is used to provide an output 12 which can be utilized by an engine control module (ECM). In the illustrated embodiment, the output is a frequency but voltages or other output could be provided in various other embodiments.

One or more power supplies 26 may be useful to power internal components of the circuit 10. Input power 27 may be provided to power supply 26. Furthermore, a frequency which may be achieved by frequency generator 34 which may be utilized, provide outputs 12 based on the output of the mass air flow as sensed by the hot wire 24. Base frequency may at least be assisted in being provided by device 28.

While prior art devices have adjusted the analog gain on the output side of temperature sensed by thermistors and the hot wire 24, through analog techniques, the applicant has provided a way to remotely adjust the resistance of the first leg 22 based on temperature and/or other features. This can be used to allow the hot wire 24 to provide more accurate outputs 12 which can be predictably achieved through the use of microprocessor 18.

Additionally, unlike prior art techniques, the microprocessor 18 can adjust the digital potentiometer 16 "on the fly." One rather unique effect of this improvement which is not experienced with analog bridges is that a step increase in resistance can occur at the potentiometer 16. The step increase then would otherwise throw a ripple effect into the circuit. The applicant has devised at least two different ways and there may even be more ways to address this ripple phenomenon. First, the applicant can ignore the output for a period of time such as about ten milliseconds or so for that ripple effect to flatten out considerably. An earlier reading from the hot wire 24 could be utilized for the output 12 during that time period or other selected output could be provided during that time.

Alternatively, the microprocessor 18 could calculate the expected output based on conditions immediately before changing the resistance of the digital potentiometer 16 and provide that a signal 12 to provide the desired time period until the ripple effect has subsided.

In this embodiment, a change in the slope could be provided to the signal from the hot wire 24. Additionally, the resistance at potentiometer 16 may be changed in response to temperature changes. Additionally, the output 12 can be manipulated by the microcontroller 18 for specific applications, such as to attempt to match an actual mass flow curve, or other capacity.

The applicant has found that a much more cost effective temperature sensor 23 can be employed than a thermistor in some embodiments such as a diode which could be on the order of a few cents as opposed to a thermistor which may be on the order of $1.00 to $2.00. Furthermore, during the calibration step, instead of relying on laser trimming of diodes 30,32 as has been done in prior art techniques, the microcontroller 18 together with the digital potentiometer 16 can be calibrated relative to known temperatures of the hot wire sensor 16 so that accurate and precise control of the digital potentiometer 16 by the microprocessor 18 allow the microprocessor to coordinate to adjust the appropriate settings of the potentiometer 16 during actual use. This can be done independently of changing the resistance 30,32 of the resistors 30,32 as would be understood by those of ordinary skill in the art.

Although a digital potentiometer 16 is shown, pulse width modulator technology could also be utilized to provide a digital based resistance on leg 22 upon receipt of a control signal 18 which is not analog as would be provided by a thermistor.

Also, unlike prior art technology both gain and offset may also be adjusted on the fly by the applicant's technology which would not be a possibility of the prior art systems.

In the first generation of the applicant's device, two compensation alternatives are provided by the microcontroller 18, one on a hot side (i.e., above room temperature) and one on the cold side (i.e., below room temperature) in order to more accurately reflect the actual mass air flow as experienced in test conditions to provide the desired resistance on leg 22 so that hot wires 24 provide the desired output to output 12, which could also be manipulated before output 12 is provided for use by the engine control module.

The microprocessor 18 can be utilized to approximate a known curve or even handle other situations for which the prior art would be unable to address.

In summary, the applicant's new mass air flow sensor provides a digitally based resistance element in a Wheatstone bridge for use in a portion of a mass air flow sensor. In the applicant's preferred embodiment, this is done with a digital potentiometer 16 but could be handled with other digital based components. The digital potentiometer 16 preferably receives a digital signal while the other potentiometers could potentially receive an analog control signal. Furthermore, the potentiometer 16 may be utilized in combination with resistor 20 to complete the leg 22 but other embodiments may not need this capability.

Microprocessor 18 preferably provides an output which is the input to the potentiometer 16 which could be a digital signal or analog signal. An analog signal might be possible to be provided through another system or conditioning elements. Diode 23 preferably provides an input to the microprocessor 18 related to temperature. Unlike thermistors used in the bridge leg 22 of the prior art, the temperature sensor 23 is external to the bridge 14. The bridge can be adjusted so that the effects of the temperature can be manipulated by the microcontroller 18 before providing a signal to the digital potentiometer 16 as well as possibly modifying the signal relative to the current across the hot wire 24. The output 12 is shown as being frequency based, but it could also be voltage or current based or other appropriate signal could be provided for use by an electronic control engine control module (ECM) on a automobile.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A mass air flow sensor comprising:
   at least one semiconductor device operating as a temperature sensor outside of a Wheatstone bridge providing an output to a digital processor;
   a hot wire providing an output related to a mass air flow past the hot wire, said output operably coupled to an engine control module (ECM) when installed in a vehicle;
   wherein output of the digital processor affects the output from the hot wire;
   wherein the output directed to the ECM is treated by the processor upon step increases of temperature prior to being sent to the ECM; and
   wherein upon receiving a digital step increase in the temperature the output is set by the digital processor to eliminate ripple effects by setting the output to one of
   (a) a calculated output based on temperature before the step increase for a predetermined time, and;
   (b) an anticipated output on a predetermined mass air flow curve.

2. The mass air flow sensor of claim 1 further comprising a digital based resistance element which receives output from the digital processor.

3. The mass air flow sensor of claim 2 wherein the output from the digital processor is provided in a predetermined range.

4. The mass air flow sensor of claim 3 wherein the output from the digital processor is provided in step increases having a step of no more than about 1 degrees Celsius.

5. The mass air flow sensor of claim 2 wherein the digital based resistance element is a digital potentiometer.

6. The mass air flow sensor of claim 2 wherein the digital based resistance element is in a leg of the Wheatstone bridge, and the temperature sensor is remotely disposed relative to the leg.

7. The mass air flow sensor of claim 2 wherein the digital based resistance element is in a first leg of the Wheatstone bridge opposite a second leg having the hot wire.

8. The mass air flow sensor of claim 7 further comprising a resistor in the leg with the digitally based resistive element.

9. The mass air flow sensor of claim 7 wherein the at least one temperature sensor is external to the first leg.

10. The mass air flow sensor of claim 1 further comprising a frequency source and the output of the hot wire module affects output from the frequency source which is then provided to the engine control module when installed.

11. The mass air flow sensor of claim 1 wherein the processor receives output of the hot wire and then attempts to match a mass air flow curve to provide as an output to the ECM.

12. The mass air flow sensor of claim 1 installed in a vehicle.

13. The mass air flow sensor of claim 1 wherein the temperature sensor comprises a diode.

14. A mass air flow sensor comprising:
at least one diode performing as a temperature sensor outside of a Wheatstone bridge providing an output to a digital processor;
a hot wire providing an output related to a mass air flow past the hot wire, said output operably coupled to an engine control module (ECM) when installed in a vehicle;
wherein output of the digital processor affects the output from the hot wire;
wherein the output of the hot wire is treated by the processor upon digital step increases of temperature prior to being sent to the ECM to remove a ripple effect by one of
setting the output to (a) a calculated output for a predetermined time based on the temperature before the step increase; and
(b) an anticipated output based on a predetermined mass air flow curve.

15. The mass air flow sensor of claim 14 and wherein either the second digital output is set to an anticipated second digital output for a predetermined time upon receiving a step increase in the first digital input.

16. The mass air flow sensor of claim 15 wherein the second digital output is maintained for a predetermined time by the digital processor at a predetermined value upon receiving a step increase for the first digital input.

* * * * *